United States Patent
Kaku et al.

[11] Patent Number: 5,987,064
[45] Date of Patent: *Nov. 16, 1999

[54] EYE PATTERN DISPLAY METHOD, EYE PATTERN DISPLAY APPARATUS, AND COMMUNICATIONS APPARATUS

[75] Inventors: Takashi Kaku; Hideo Miyazawa, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/547,614

[22] Filed: Oct. 24, 1995

[30] Foreign Application Priority Data

Nov. 2, 1994 [JP] Japan .................................. 6-269955

[51] Int. Cl.⁶ ........................................................ H04B 3/46
[52] U.S. Cl. ............................ 375/228; 375/340; 375/371
[58] Field of Search ...................................... 375/228, 261, 375/327, 329, 340, 348, 371; 370/516

[56] References Cited

U.S. PATENT DOCUMENTS

| | | | |
|---|---|---|---|
| 4,247,944 | 1/1981 | Sifford | 375/340 |
| 4,381,546 | 4/1983 | Armstrong | 364/514 |
| 4,532,640 | 7/1985 | Bremer et al. | 375/261 |
| 4,631,738 | 12/1986 | Betts et al. | 375/345 |
| 4,646,325 | 2/1987 | Zuranski et al. | 375/327 |
| 4,683,578 | 7/1987 | Betts et al. | 375/345 |
| 4,855,692 | 8/1989 | Kennard et al. | 332/17 |
| 4,993,047 | 2/1991 | Moffatt et al. | 375/261 |
| 5,081,649 | 1/1992 | Kennard | 375/261 |
| 5,559,799 | 9/1996 | Murata et al. | 375/329 |

FOREIGN PATENT DOCUMENTS

| | | |
|---|---|---|
| 4-315340 | 11/1992 | Japan . |
| 2 267 629 | 12/1993 | United Kingdom . |

*Primary Examiner*—Don N. Vo
*Attorney, Agent, or Firm*—Staas & Halsey LLP

[57] ABSTRACT

The position of an input signal in a two-dimensional plane is moved into the first quadrant, and based on the position of the signal point moved into the first quadrant, the origin of a signal point plane is shifted, and the signal for which the origin has been shifted is enlarged by a prescribed magnification factor for display on a display screen.

21 Claims, 9 Drawing Sheets

| X1 | [FF8800] | X9 | [000800] | Y1 | [007800] | Y9 | [FFF800] |
| X2 | [FF9800] | X10 | [001800] | Y2 | [006800] | Y10 | [FFE800] |
| X3 | [FFA800] | X11 | [002800] | Y3 | [005800] | Y11 | [FFD800] |
| X4 | [FFB800] | X12 | [003800] | Y4 | [004800] | Y12 | [FFC800] |
| X5 | [FFC800] | X13 | [004800] | Y5 | [003800] | Y13 | [FFB800] |
| X6 | [FFD800] | X14 | [005800] | Y6 | [002800] | Y14 | [FFA800] |
| X7 | [FFE800] | X15 | [006800] | Y7 | [001800] | Y15 | [FF9800] |
| X8 | [FFF800] | X16 | [007800] | Y8 | [000800] | Y16 | [FF8800] |

Fig.7

EYE PATTERN DISPLAY METHOD, EYE PATTERN DISPLAY APPARATUS, AND COMMUNICATIONS APPARATUS

BACKGROUND OF THE INVENTION

1. Field of the Invention

The present invention relates to an eye pattern display method and an eye pattern display apparatus for data transmission using a modem or the like. The invention also relates to a communications apparatus for use with the same.

2. Description of the Related Art

In data transmission using a modem, for example, data for transmission is encoded, before being transmitted, into signal points arranged in a two-dimensional or a complex plane (two-dimensional values or complex numbers). At the receiving end, the locations of the received signal points are determined, and based on the signal points thus determined, data demodulation is performed.

The number of signal points and their locations in the two-dimensional or the complex plane are specified for each of various transmission schemes. Under ideal conditions, the received signal points would always appear in their specified locations, but in the presence of channel characteristic degradation, the received signal points tend to be displaced from the specified locations because of the superposition of noise, the occurrence of phase shifting, etc. This tendency becomes more pronounced as channel characteristic degradation increases.

Since communication becomes impossible, for example, when the channel characteristics greatly degrade, it has been practiced to examine the reception condition of the modem and take necessary countermeasures.

To examine the reception condition of a modem, the modem is connected to an oscilloscope on which an eye pattern is displayed to view a displacement of signal points, and based on the amount of displacement, the degree of eye pattern degradation (channel characteristic degradation) is determined.

In recent years, there has been an increasing need for higher-rate transmission using modems. This can be attained by increasing the number of signal points to be transmitted. However, the number of signal points increases exponentially with increasing transmission rate; for example, 128 signal points are required for a transmission rate of 14.4 Kbps specified in the ITU-T recommendation V.33, and a maximum of 896 signal points for a transmission rate of 28.8 Kbps specified in V.34.

With low transmission rates, since the number of signal points required is small, the spacing of the signals displayed on an oscilloscope is relatively wide, so that the amount of displacement of the received signal points can be easily discerned by displaying the eye pattern on the oscilloscope.

However, as the number of signal points increases, the signal point spacing falls compared to low-rate transmission. As a result, on the eye pattern displayed on the oscilloscope, the signal points are displayed closer to each other. This tendency becomes more pronounced as the transmission rate is increased.

The closer spacing of the displayed signal points makes it difficult to discern whether each displayed signal point is located in its intended position or is displaced from that position, and if displaced, how much it is displaced. The result of this is the inability to accurately examine the degradation of the eye pattern.

SUMMARY OF THE INVENTION

In view of the above difficulty, it is an object of the present invention to provide a method and apparatus for eye pattern display by which eye pattern degradation can be examined accurately even if the number of signal points is increased.

It is also an object of the invention to provide a communication apparatus for use with the same.

According to the present invention, there is provided a method of outputting an eye pattern that indicates positions of reception signals on a two-dimensional plane, comprising the steps of: making a decision about which of plural regions contains a reception signal, said regions being defined by dividing the two-dimensional plane into a plurality of regions, each including at least one ideal signal; applying a moving operation, based on the decision made in step a), to the reception signal to move the reception signal on the two-dimensional plane, said moving operation being carried out such that ideal signals contained in the respective regions are superimposed on each other when the moving operation is applied thereto; and outputting the moved reception signal.

According to the present invention there is also provided an apparatus for outputting an eye pattern that indicates positions of reception signals on a two-dimensional plane, comprising: means for making a decision about which of plural regions contains a reception signal, said regions being defined by dividing the two-dimensional plane into a plurality of regions, each including at least one ideal signal; means for applying a moving operation, based on the decision made by the decision making means, to the reception signal to move the reception signal on the two-dimensional plane, said moving operation being carried out such that ideal signals contained in the respective regions are superimposed on each other when the moving operation is applied thereto; and means for outputting the moved reception signal.

According to the present invention, there is also provided a communication apparatus for demodulating a modulated signal and obtaining a reception signal having a two-dimensional value, comprising: means for making a decision about which of plural regions contains a reception signal, said regions being defined by dividing the two-dimensional plane into a plurality of regions each including at least one ideal signal; means for applying a moving operation, based on the decision made by the decision making means, to the reception signal to move the reception signal on the two-dimensional plane, said moving operation being carried out such that ideal signals contained in the respective regions are superimposed on each other when the moving operation is applied thereto; and means for outputting the moved reception signal.

DESCRIPTION OF THE PREFERRED EMBODIMENTS

Before describing the preferred embodiments according to the present invention, examples of the related art are given with reference to the accompanying drawings.

Figure 1:
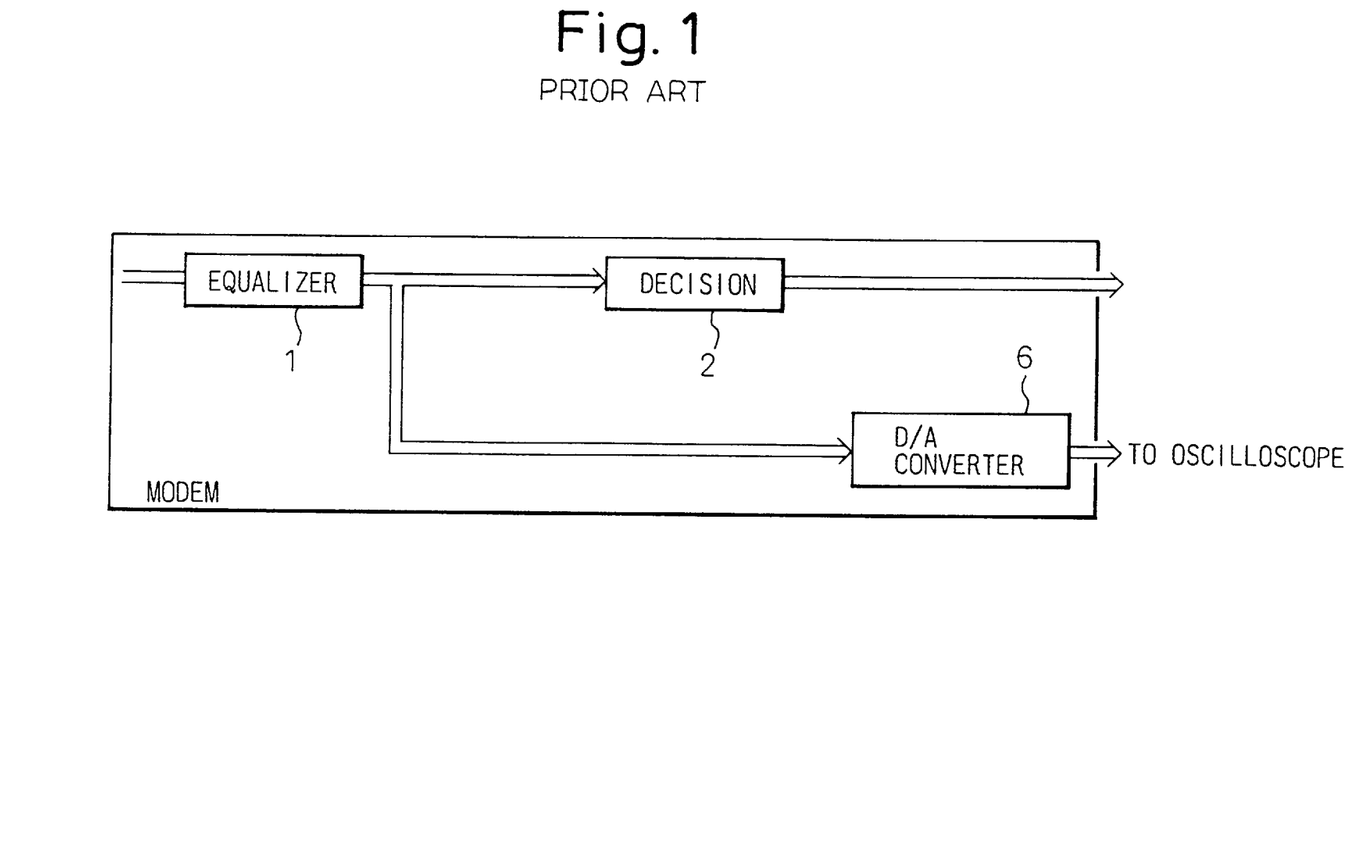
FIG. 1 is a diagram showing a modem apparatus according to the prior art.

FIG. 1 is a block diagram showing a portion of a prior art modem apparatus which is related to an eye pattern display. In FIG. 1, reference numeral 1 is an equalizer for removing noise from the received signal; 2 is a decision-making device for making a decision about each received signal point and for outputting the result of the decision; and 6 is a digital-analog converter (hereinafter called the D/A converter) for converting the digital signal output from the equalizer 1 into an analog signal for output. The output of the D/A converter 6 is coupled via an output terminal to an oscilloscope for displaying an eye pattern. The double lines shown in FIG. 1 and subsequent figures indicate that the value carried thereon is a two-dimensional value or a complex number.

Signal points output from the modem are displayed on the screen of the oscilloscope.

Figure 2:
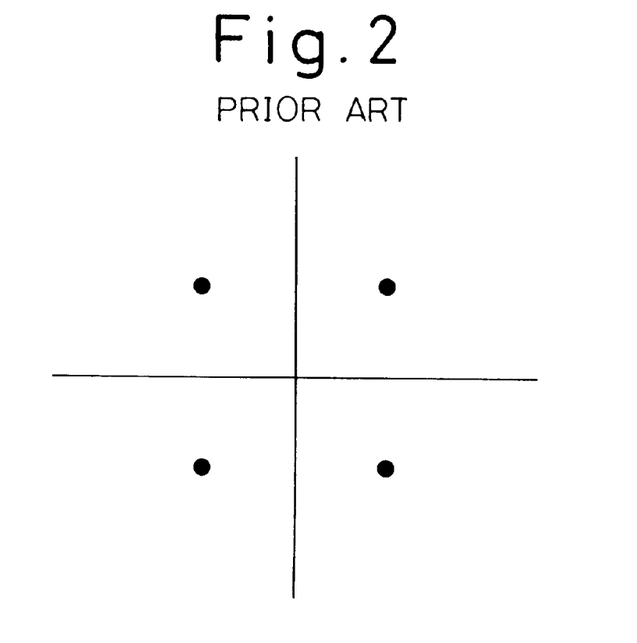
FIG. 2 is a diagram showing a normal eye pattern.
Figure 3:
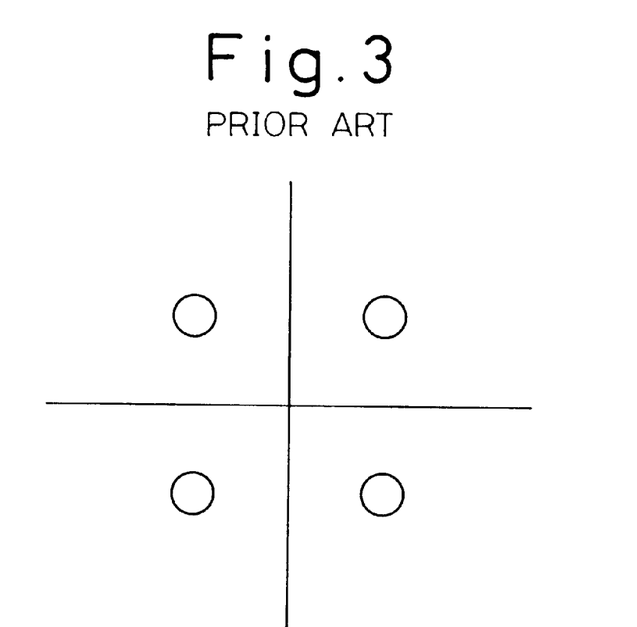
FIG. 3 is a diagram showing a degraded eye pattern.

FIGS. 2 and 3 each show an example of the eye pattern displayed on the oscilloscope. FIG. 2 shows an eye pattern in normal condition, and FIG. 3 shows an eye pattern in degraded condition. FIGS. 2 and 3 each show an eye pattern for a 4-state signal set.

In the case of the normal eye pattern, the signal points are located in respective ideal positions as shown in FIG. 2. On the other hand, in the case of a degraded eye pattern, the signal points are spread out around the point where each point should be located, as shown in FIG. 3, for example.

Such an eye pattern is displayed on the screen of the oscilloscope and the amount of displacement of the signal points from the ideal positions is examined to determine the reception condition of the modem, the degree of channel degradation, etc.

With low transmission rates, since the number of signal points required is small, the spacing of the signals displayed on the oscilloscope is relatively wide, so that the amount of displacement of the received signal points can be easily discerned by displaying the eye pattern on the oscilloscope.

However, as the number of signal points increases, the signal point spacing falls compared to low-rate transmission. As a result, in the eye pattern displayed on the oscilloscope, the signal points are displayed closer to each other. This tendency becomes more pronounced as the transmission rate is increased.

The closer spacing of the displayed signal points makes it difficult to discern whether each displayed signal point is located in its intended position or is displaced from that position and, if displaced, by how much it is displaced. The result of this is the inability to accurately examine the degradation of the eye pattern.

The preferred embodiments of the present invention will now be described with reference to the accompanying drawings.

Figure 4:
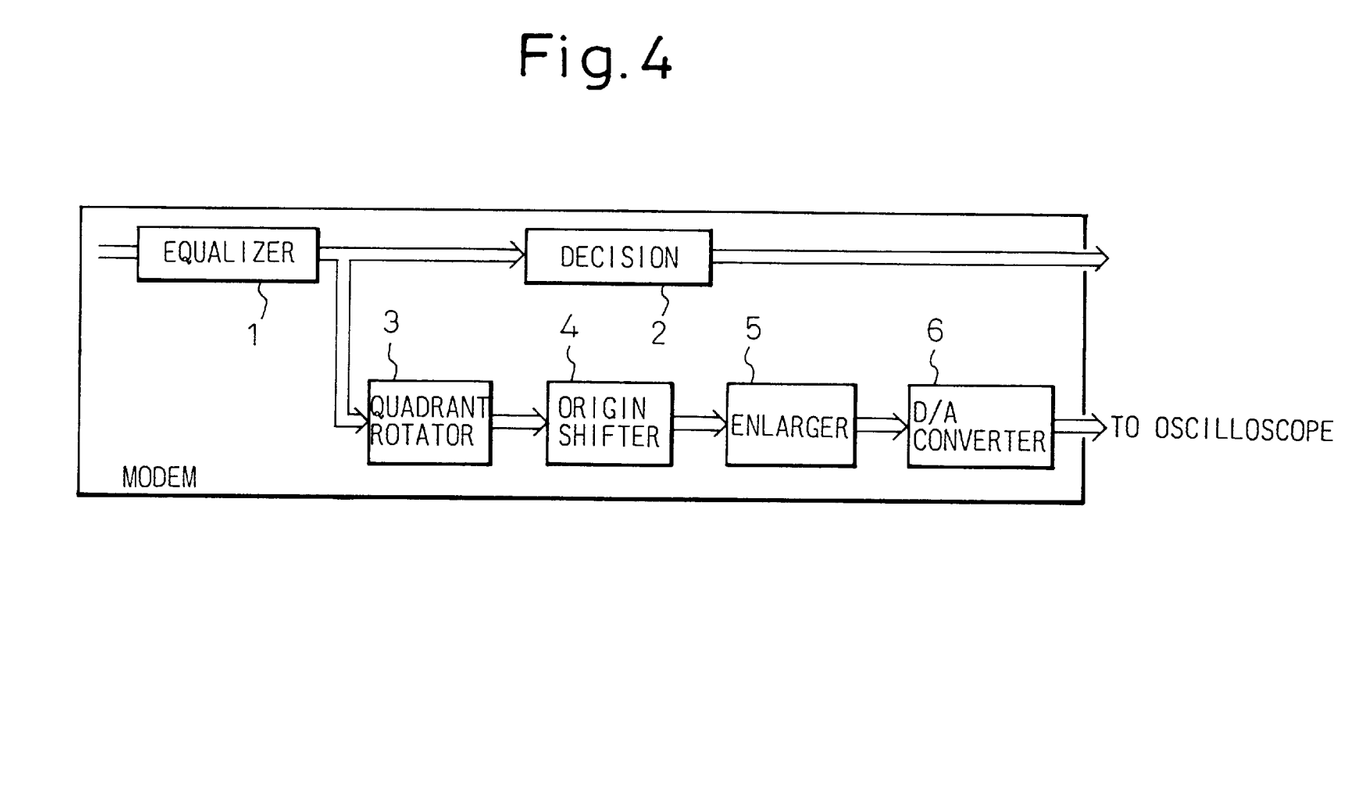
FIG. 4 is a diagram showing the configuration of a modem apparatus according to one embodiment of the present invention.

FIG. 4 is a diagram showing a modem apparatus according to one embodiment of the present invention. FIG. 4 specifically shows a portion of the modem apparatus related to eye pattern display.

In the figure, reference numeral 1 is an equalizer, and 2 is a decision-making device. The equalizer 1 and the decision-making device 2 are identical to those described with reference to FIG. 1.

Reference numeral 3 is a quadrant rotator which makes a decision about which quadrant of the coordinate plane contains the received signal point and which carries out a quadrant rotation on the basis of the result of the decision; 4 is an origin shifter for shifting the origin of the signal point coordinates rotated by the quadrant rotator 3 and correspondingly shifting, or translating (i.e., applying a shift, or translation, operation to) the signal; 5 is an enlarger for enlarging the signal point coordinate plane whose origin has been shifted by the origin shifter 4; and 6 is a D/A converter for converting a digital signal to an analog signal for output on an oscilloscope. This embodiment of the invention will be described in further detail below with reference to the drawing. A detailed description of each constituent element is given in conjunction with a description of its operation.

Figure 5:
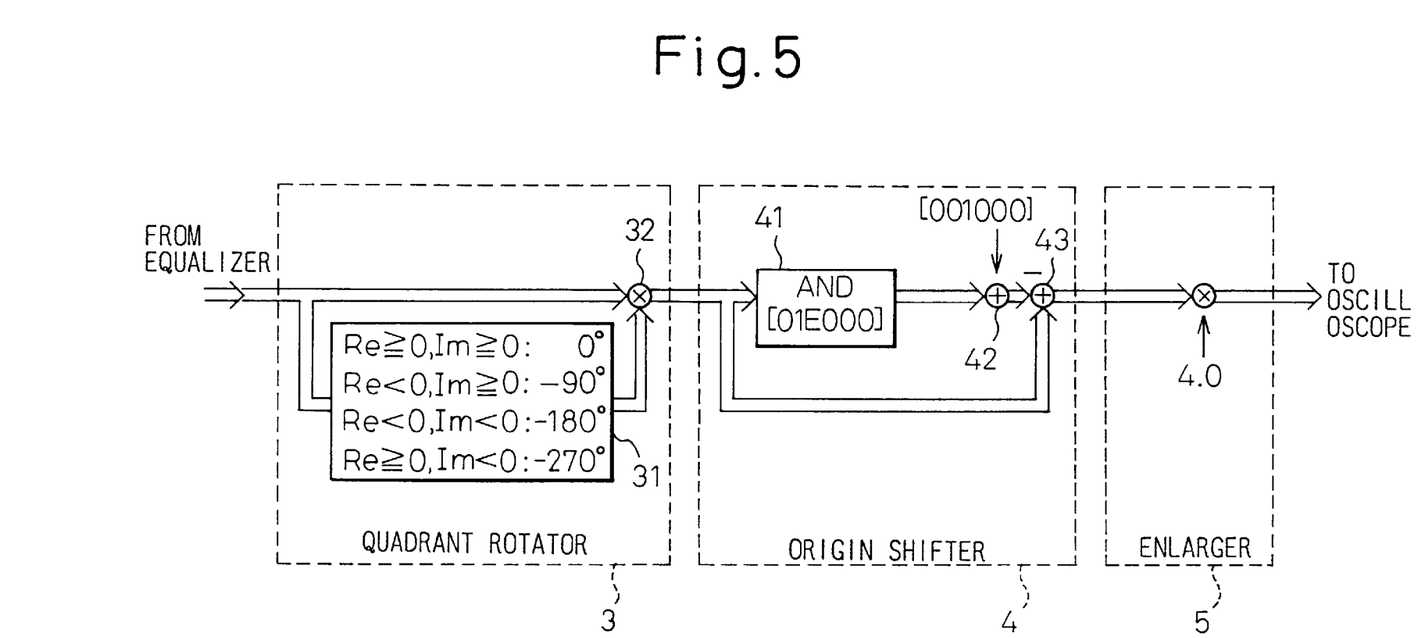
FIG. 5 is a diagram showing an equivalent circuit of constituent elements of the embodiment.

FIG. 5 is a diagram showing the configuration of the quadrant rotator 3, origin shifter 4, and enlarger 5 in equivalent circuit form. In this embodiment, the received signal point is moved into the first quadrant, based on which result the origin shifting, enlargement, and other operations are performed. From a real component and an imaginary component of a signal input as a complex number, the quadrant rotator 3 makes a decision about which quadrant contains the input signal, and based on the result of the decision, applies a rotation to the signal so that the signal point is moved into the first quadrant.

In FIG. 5, reference numeral 31 is a decision-making device for making a decision about which quadrant contains the input signal, and 32 is a multiplier for applying a rotation to the input signal on the basis of the decision made by the decision-making device 31. When neither the real component Re nor the imaginary component Im of the signal input to the quadrant rotator 3 is less than 0, the decision-making device 31 decides that the signal is located in the first quadrant. In this case, since the signal point is already in the first quadrant, the rotation operation is not performed. When the real component Re of the input signal is less than 0 and the imaginary component Im is not less than 0, the decision-making device 31 in the quadrant rotator 3 decides that the signal is in the second quadrant. In this case, the multiplier 32 rotates the input signal through −90 degrees to move the signal point into the first quadrant. When the real component and imaginary component of the signal point are both less than 0, the decision-making device 31 decides that the signal point is in the third quadrant. In this case, the multiplier 32 rotates the signal point through −180 degrees to move the signal point into the first quadrant. When the real component of the signal point is not less than 0 and the imaginary component is less than 0, the decision-making device 31 decides that the signal point is in the fourth quadrant, so that the multiplier 32 rotates the signal point through −270 degrees to move the signal point into the first quadrant. In this manner, the quadrant rotator 3 makes a decision about the location of the input signal and, based on the result of the decision, performs the rotation operation to move the signal into the first quadrant.

Figure 6:
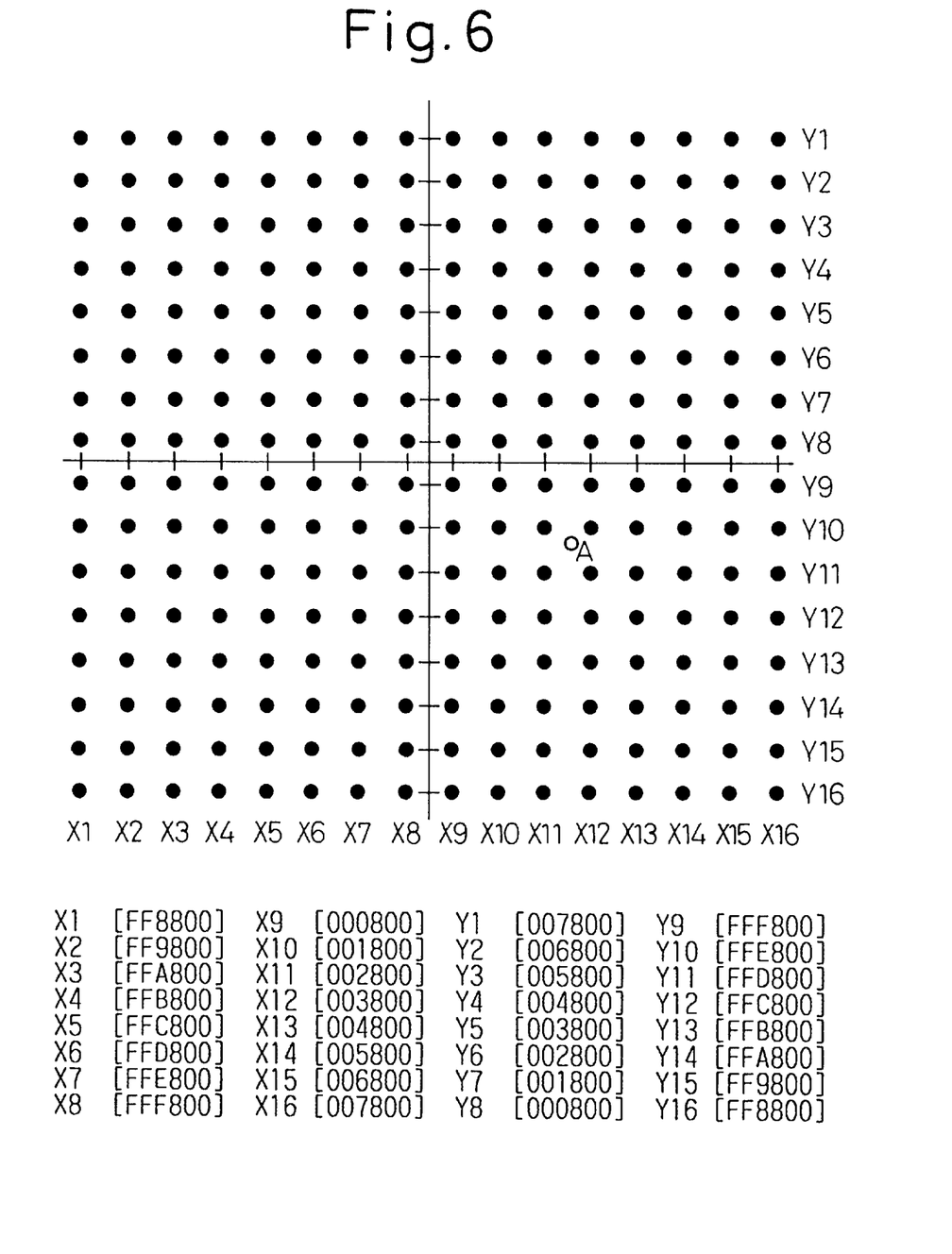
FIG. 6 is a diagram showing an eye pattern for a modem according to the embodiment.

FIG. 6 is a diagram showing the signal point arrangement for an input signal in 256 QAM. In FIG. 6, white dot A indicates a signal point received at a certain instant in time. Black dots each indicate an ideal signal point location, and X1 to X16 and Y1 to Y16 indicate the coordinate values of the real components and imaginary components, respectively, of the respective signal points. In the figures and description hereinafter given, numeric values in square brackets are in hexadecimal. In the example shown in FIG. 6, the signal points are arranged spaced [001000] apart. Note, however, that the signal points indicated by black dots are not necessarily displayed on the screen of the oscilloscope. The eye pattern shown in FIG. 6 represents 256 signal point values.

In FIG. 6, when the point A is received, the equalizer 1 outputs a signal containing a real component [003260] and an imaginary component [FFE5A3] indicating the coordinate values of the point A. Based on this signal, the quadrant rotator 3 makes a decision about in which quadrant the point A is located in the coordinate vector plane. In the illustrated example, the real component is greater than 0 and the imaginary component is smaller than 0, so that the quadrant rotator 3 decides that the point A is located in the fourth quadrant. Based on the result of the decision, the quadrant rotator 3 rotates the signal [003260], [FFE5A3] of the point A through −270 degrees, and outputs a signal containing a real component [001A5D] and an imaginary component [003260].

Figure 7:
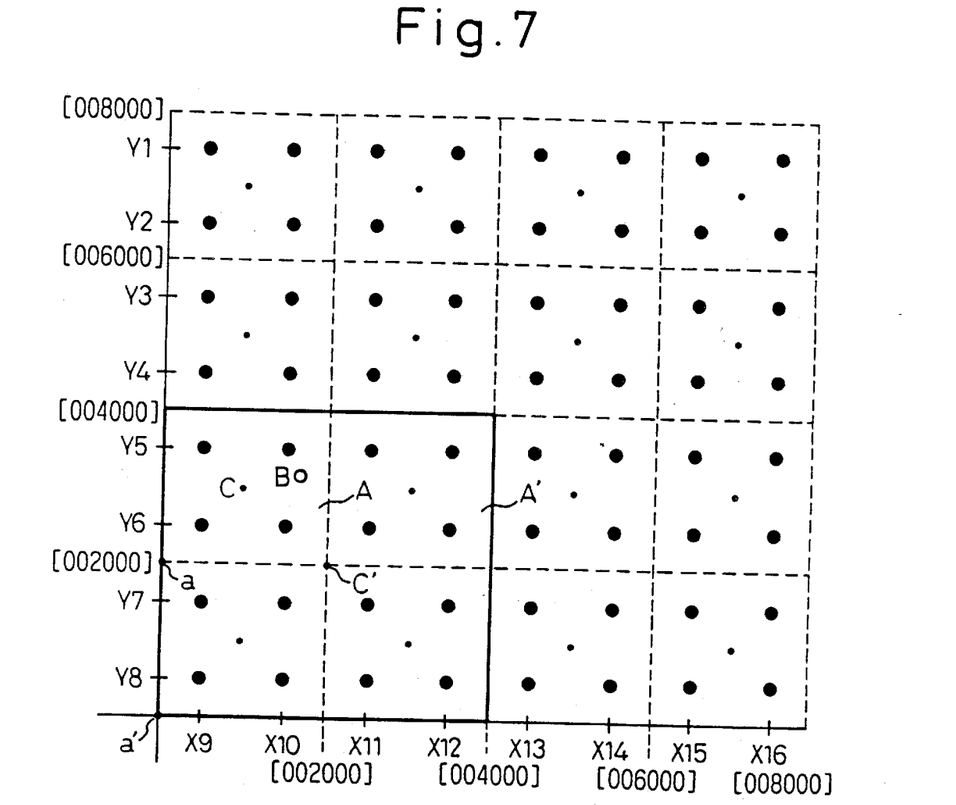
FIG. 7 is a diagram showing an eye pattern after a signal has been rotated into the first quadrant.

FIG. 7 shows an eye pattern after the signal has been moved into the first quadrant. White dot B indicates the signal point after the point A has been rotated through −270 degrees, and is represented by coordinate values [001A5D] and [003260]. In this manner, the quadrant rotator 3 convolves the eye pattern into the first quadrant. Since all signal points are moved into the first quadrant by the quadrant rotator 3, the number of signal points can in effect be reduced by a factor of 4.

The signal from the quadrant rotator 3 is input to the origin shifter 4. The quadrant rotator 3 is coupled to the origin shifter 4, as shown in FIG. 5. The origin shifter 4 shifts the origin for the signal point rotated by the quadrant rotator 3 and correspondingly shifts, or translates (i.e., applies a shift or translation to) the associated signal points.

In FIG. 5, reference numeral 41 is an AND circuit for ANDing the input signal with [01E000]; 42 is a first adder for adding [001000] to the output of the AND circuit 41; and 43 is a second adder for subtracting the output of the first adder 42 from the signal input to the origin shifter 4. The operation of each element will be described in detail later.

The AND circuit 41 in the origin shifter 4 ANDs the coordinate values of the input signal point with [01E000]. In the example of FIG. 7, the coordinate values [001A5D] and [003260] of the point B are each ANDed with [01E000].

The output of the quadrant rotator 3 is ANDed with [01E000] for reasons to be explained hereinafter. First, [01E000] is ANDed with each of the coordinate values of X9, X10, X11, X12, X13, X14, X15, and X16 on the X axis.

The coordinate of X9 is [000800]. This can be expressed in binary as 0000 0000 0000 1000 0000 0000

On the other hand, [01E000] can be expressed in binary as 0000 0001 1110 0000 0000 0000

These are ANDed as shown below.

|      | 0000 | 0000 | 0000 | 10000 | 0000 | 0000 |
|------|------|------|------|-------|------|------|
| AND) | 0000 | 0001 | 1110 | 0000  | 0000 | 0000 |
|      | 0000 | 0000 | 0000 | 0000  | 0000 | 0000 |

This is converted to hexadecimal as [000000]. Likewise,

| | | | | | | |
|---|---|---|---|---|---|---|
| X10 | [001800] | | | | | |
| | 0000 | 0000 | 0001 | 1000 | 0000 | 0000 |
| AND) | 0000 | 0001 | 1110 | 0000 | 0000 | 0000 |
| | 0000 | 0000 | 0000 | 0000 | 0000 | 0000 |
| . . . | [000000] | | | | | |
| X11 | [002800] | | | | | |
| | 0000 | 0000 | 0010 | 1000 | 0000 | 0000 |
| AND) | 0000 | 0001 | 1110 | 0000 | 0000 | 0000 |
| | 0000 | 0000 | 0010 | 0000 | 0000 | 0000 |
| . . . | [002000] | | | | | |
| X12 | [003800] | | | | | |
| | 0000 | 0000 | 0011 | 1000 | 0000 | 0000 |
| AND) | 0000 | 0001 | 1110 | 0000 | 0000 | 0000 |
| | 0000 | 0000 | 0010 | 0000 | 0000 | 0000 |
| . . . | [002000] | | | | | |
| X13 | [004800] | | | | | |
| | 0000 | 0000 | 0100 | 1000 | 0000 | 0000 |
| AND) | 0000 | 0001 | 1110 | 0000 | 0000 | 0000 |
| | 0000 | 0000 | 0100 | 0000 | 0000 | 0000 |
| . . . | [004000] | | | | | |
| X14 | [005800] | | | | | |
| | 0000 | 0000 | 0101 | 1000 | 0000 | 0000 |
| AND) | 0000 | 0001 | 1110 | 0000 | 0000 | 0000 |
| | 0000 | 0000 | 0100 | 0000 | 0000 | 0000 |
| . . . | [004000] | | | | | |
| X15 | [006800] | | | | | |
| | 0000 | 0000 | 0110 | 1000 | 0000 | 0000 |
| AND) | 0000 | 0001 | 1110 | 0000 | 0000 | 0000 |
| | 0000 | 0000 | 0110 | 0000 | 0000 | 0000 |
| . . . | [006000] | | | | | |
| X6 | [007800] | | | | | |
| | 0000 | 0000 | 0111 | 10000 | 0000 | 0000 |
| AND) | 0000 | 0001 | 1110 | 0000 | 0000 | 0000 |
| | 0000 | 0000 | 0110 | 0000 | 0000 | 0000 |
| . . . | [006000] | | | | | |

As can be seen, the ANDing of the respective coordinate values with [01E000] yields the same value between X9 and X10, between X11 and X12, between X13 and X14, and between X15 and X16. Extending this, we have the following relations.

| Input | AND result |
|-------|------------|
| [000000] − [001FFF] . . . | [000000] |
| [002000] − [003FFFF] . . . | [002000] |
| [004000] − [005FFF] . . . | [004000] |
| [006000] − [007FFF] . . . | [006000] |

The same applies for the Y axis

The above will be explained with reference to FIG. 7. In FIG. 7, the signal point plane is divided into a plurality of square regions each enclosed by dashed lines. Four ideal signal points are arranged in each square region. In FIG. 7, square region A in which the point B is located lies from [000000] to [001FFF] on the X axis and from [002000] to [003FFF] on the Y axis. When a signal point within this region is ANDed with [01E000], an X-axis value [000000] and a Y-axis value [002000] are obtained. These coincide with the coordinates of point a in the square region A.

That is, by ANDing with [01E000] and calculating the coordinate values of the lower left corner of each square region in FIG. 7, it is possible to determine in which square region the signal point in question is located.

Next, in the origin shifter 4, [001000] is added to the X-axis component and Y-axis component of the signal ANDed with [01E000]. The results are shown below.

| Input | Sum |
|---|---|
| [000000] – [001FFF] . . . | [001000] |
| [002000] – [003FFF] . . . | [003000] |
| [004000] – [005FFF] . . . | [005000] |
| [006000] – [007FFF] . . . | [007000] |

As shown in FIG. 7, each square region enclosed by dashed lines measures [002000] in both the X and Y directions. Therefore, by adding [001000], which is half the length along each axis of the square region, to the signal obtained by ANDing the coordinates of the received signal with [01E000], the center point of the square region in which the received signal point is located can be calculated.

In the square region A shown in FIG. 7, the coordinates of the point a are [000000] on the X axis and [002000] on the Y axis. By adding [001000] to these coordinate values, we have

[000000]+[001000]=[001000]

[002000]+[001000]=[003000]

These coincide with the coordinate values of point C in FIG. 7. In this manner, the center point of the square region A can be obtained.

Next, the position of the point B, rotated into the first quadrant, is calculated relative to the point C as the shifted origin. Since the coordinates of the point B are [001A5D] and [003260], real component [001A5D]–[001000]=[000A5D]

imaginary component [003260]–[003000]=[000260]

Thus coordinates [000A5D] and [000260] are obtained which are the new coordinate values of the point B in the coordinate system with the shifted origin.

Figure 8:
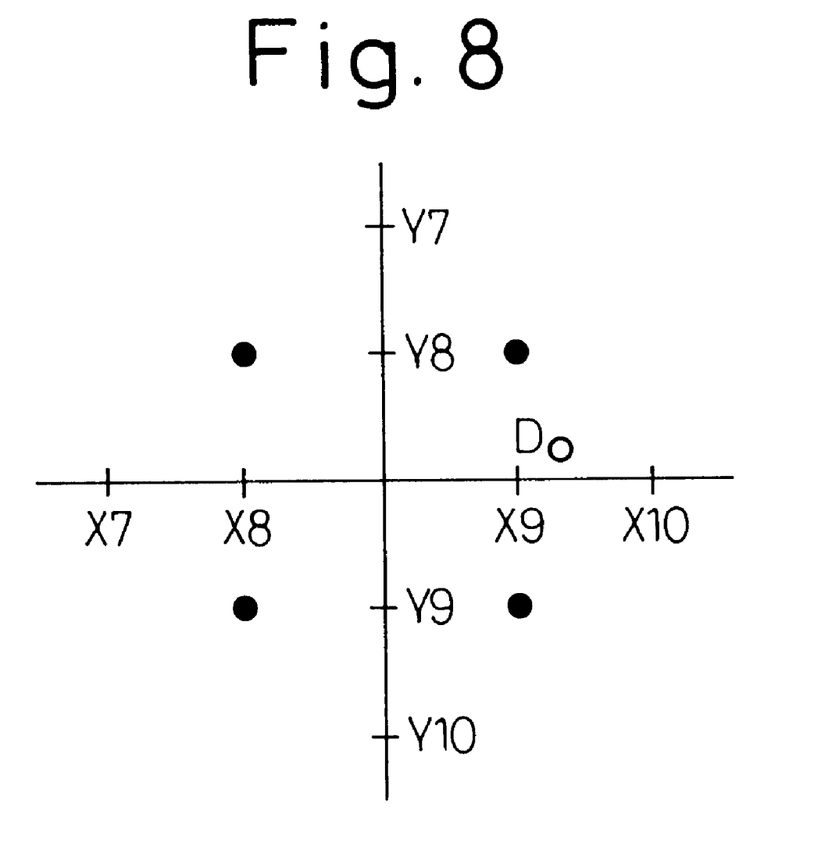
FIG. 8 is a diagram showing an eye pattern after origin shifting.

FIG. 8 shows an eye pattern obtained after the origin has been shifted. Point D indicates the position of the point B after its coordinates have been obtained relative to the shifted origin.

As shown in FIG. 8, the center point C of the square region A is shifted to the origin of FIG. 8, and correspondingly, the point B is shifted to the position of the point D. In FIG. 8, the black dots indicate ideal signal point locations, but these are not necessarily displayed on the screen.

With the above processing, all the outputs from the origin shifter are convolved into the square region where four ideal signal points are arranged. Therefore, by performing the origin shifting, the number of signal points rotated into the first quadrant, in effect, can be further reduced by a factor of 16, and thus by a factor of 64 compared to the number of signal points shown in FIG. 6.

The value [01E000] can be determined appropriately according to the common size of each of the square regions into which the first quadrant is split or divided as seen in FIG. 7 or to the total number of signal points. For example, when displaying a 16-value eye pattern on an oscilloscope, a value into which four of the signal points moved into the first quadrant can be quantized, should be taken instead of [01E000]; in the illustrated example, [01C000] is such a value. In this case, each square region enclosed by solid lines in FIG. 7 is treated as a unit, and the following values are obtained.

| Input | AND result |
|---|---|
| [000000] – [003FFF] . . . | [000000] |
| [004000] – [007FFF] . . . | [004000] |

In this case, the length of each side of the square region is [004000]; therefore, to obtain the center point, [002000] should be added to [000000] or [004000]. Thus, point C' in FIG. 7 can be made as the origin of the square region A'.

The value with which to AND the output signal of the quadrant rotator 3 and the value added to obtain the center point can be appropriately determined according to how the coordinates of signal points are taken, how large is the square region used as a unit of display, etc.

By supplying the output of the origin shifter 4 to the oscilloscope, the eye pattern of FIG. 8 can be displayed on the screen of the oscilloscope. However, since the size of the eye pattern of FIG. 8 is the same as the size of one square region in FIG. 7, if the number of signal points is very large, it may not be possible to accurately discern the amount of displacement of signal points since the signal points are displayed very close to each other. Therefore, the enlarger 5 in FIG. 5 performs processing to enlarge the eye pattern for display on the oscilloscope.

In the enlarger 5, the real component and imaginary component of the input signal are each multiplied by a magnification factor 4.0. For point D in FIG. 8 real component [000A5D]×4.0=[002974]

imaginary component [000260]×4.0=[000980]

Figure 9:
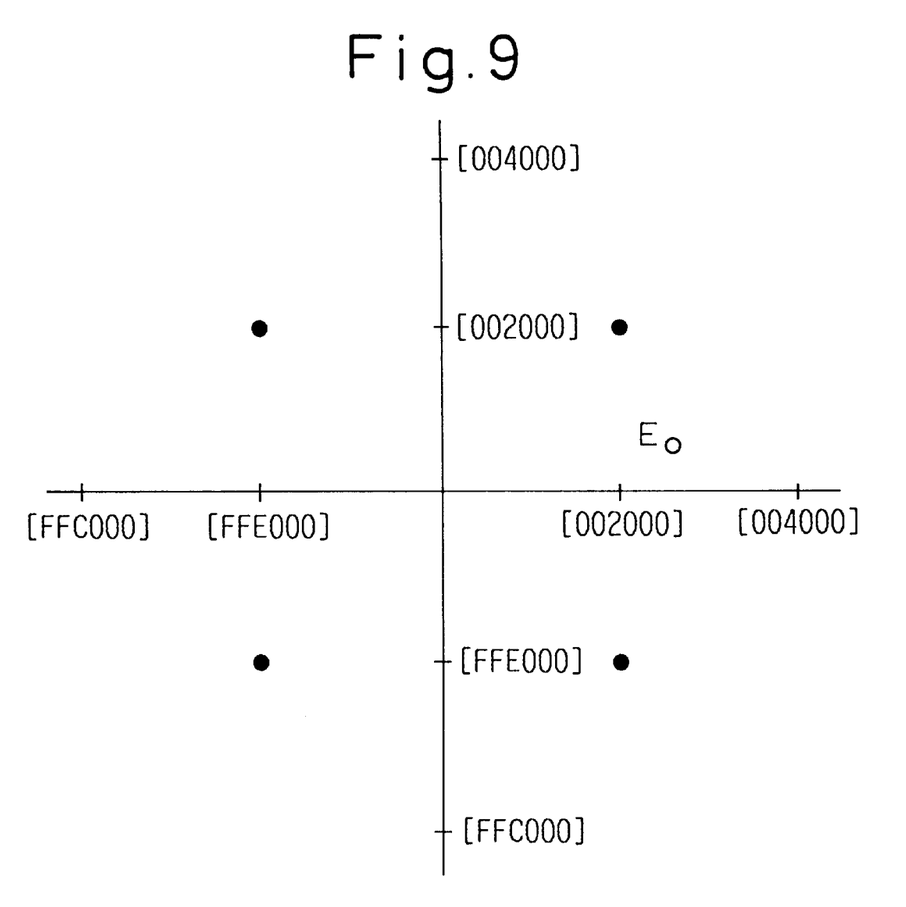
FIG. 9 is a diagram showing an eye pattern after enlargement.

The eye pattern produced by multiplying by the magnification factor 4.0 is shown in FIG. 9. In FIG. 9, point E corresponds to the position of the point D in FIG. 8 after multiplying its coordinate values by the magnification factor 4.0, and is represented by coordinates [002974] and [000980]. By magnifying the signal values output from the origin shifter 4 in this manner, the eye pattern shown in FIG. 8 is magnified four times for display on the oscilloscope. Therefore, the spacing of the signal points is correspondingly enlarged so that even if the amount of displacement of the received signal point (point E) is small, the displacement from its specified location can be discerned, thus facilitating the examination of eye pattern degradation.

Figure 10:
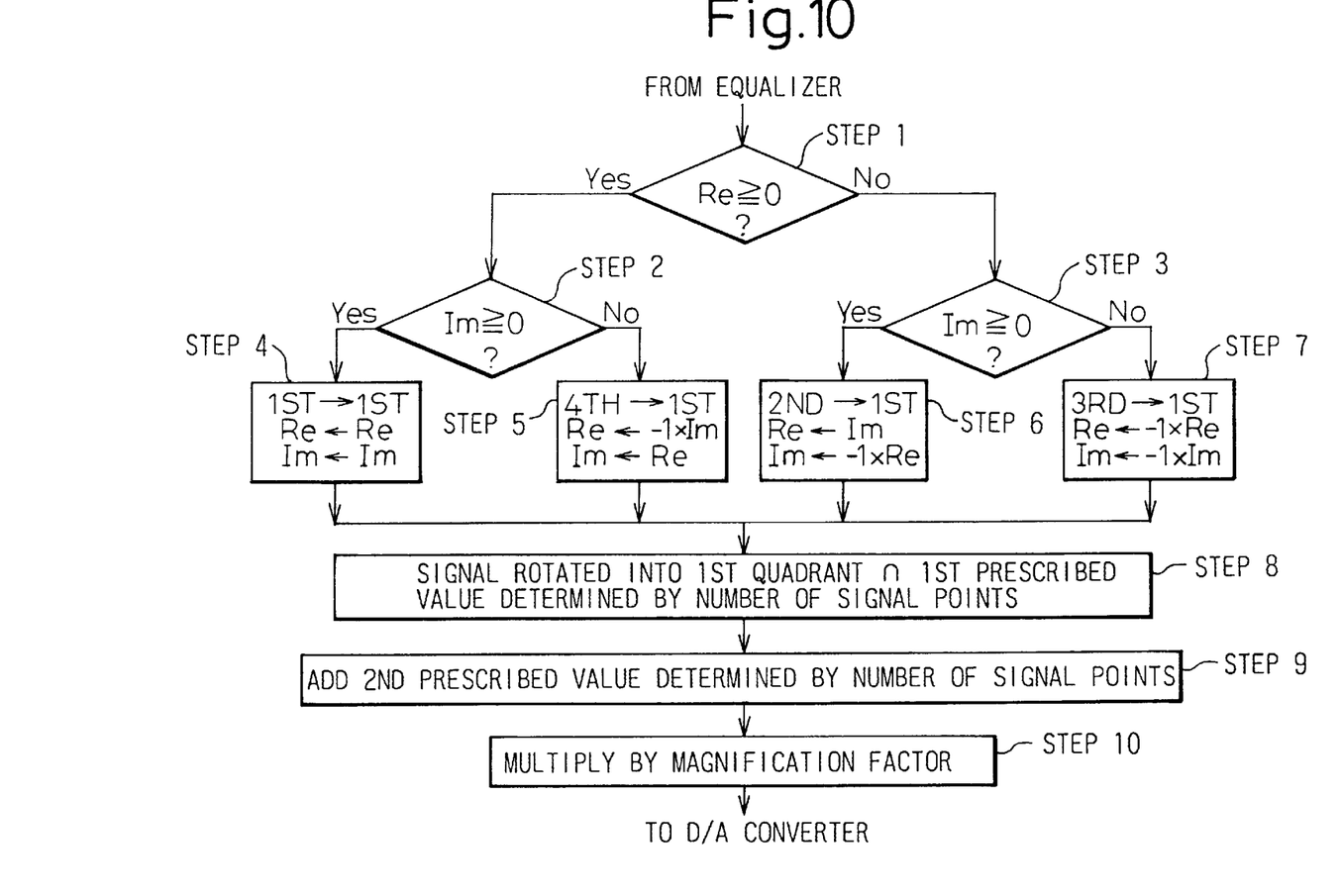
FIG. 10 is a flowchart illustrating an eye pattern display procedure according to the embodiment.

FIG. 10 is a flowchart illustrating the operating procedure in accordance with the present embodiment. The procedure for eye pattern display according to this embodiment will be described below with reference to FIG. 10. In step 1, a decision is made as to whether the real component of the signal supplied from the equalizer 1 is not less than 0. If it is decided that the real component is not less than 0, then in step 2, or if it is decided that the real component is less than 0, then in step 3, a decision is made as to whether the imaginary component of the input signal is not less than 0.

If it is decided in step 2 that the imaginary component is not less than 0, it follows that the signal is located in the first quadrant. There is no need to rotate the signal; thus in step 4, both the real component and imaginary component of the received signal are directly output.

On the other hand, if it is decided in step 2 that the imaginary component is less than 0, it follows that the signal is located in the fourth quadrant. Then, in step 5, processing is performed to move the signal from the fourth quadrant to the first quadrant. More specifically, the value of the real component of the received signal is taken as the imaginary component of the moved signal, and the value obtained by multiplying the imaginary component of the received signal by −1 is taken as the real component of the moved signal. The resulting signals are then output.

If it is decided in step 3 that the imaginary component is not less than 0, it follows that the signal is located in the second quadrant. Then, in step 6, processing is performed to move the signal from the second quadrant to the first quadrant. More specifically, the value obtained by multiplying the real component of the received signal by −1 is taken as the imaginary component of the moved signal, and the value of the imaginary component of the received signal is taken as the real component of the moved signal. The resulting signals are then output.

On the other hand, if it is decided in step 3 that the imaginary component is less than 0, it follows that the signal is located in the third quadrant. Then, in step 7, processing is performed to move the signal from the third quadrant to the first quadrant. More specifically, the value obtained by multiplying the real component of the received signal by −1 is taken as the real component of the moved signal, and the value obtained by multiplying the imaginary component of the received signal by −1 is taken as the imaginary component of the moved signal. The resulting signals are then output.

After signal rotation in any of the steps 4 to 7, the process proceeds to step 8 where the signal rotated into the first quadrant is ANDed with a first prescribed value which is predetermined based on the number of signal points. The first prescribed value corresponds, for example, to the previously mentioned [01E000].

Thereafter, in step 9, a second prescribed value, which is predetermined based on the number of signal points, is added. With this operation, origin shifting based on the received signal point is accomplished.

After shifting the origin, in step 10 the result of the addition from step 9 is multiplied by a prescribed magnification factor; the eye pattern can thus be enlarged for display.

After the enlarging operation, the resulting signal is converted by the D/A converter into an analog signal which is output to the oscilloscope connected thereto via a terminal. The oscilloscope displays the input signal on its screen.

As described, according to the above embodiment, the number of signal points displayed on an oscilloscope can be reduced, thus widening the spacing of the signal points and thereby facilitating the examination of the eye pattern compared to the prior art method.

While the above embodiment has been described by taking a modem as an example, it will be appreciated that the invention may be applied to other apparatus. Further, the above embodiment has dealt with a configuration in which all the constituent elements from the quadrant rotator 3 onward are internal to the modems; however, it will be recognized that the object of the invention can be accomplished if all or some of these elements are provided in the display device such as an oscilloscope.

Furthermore, in the above embodiment, the output of the enlarger is supplied to the oscilloscope for displays; alternatively, the output of the quadrant rotator or the output of the origin shifter may be supplied to the oscilloscope for display. That is, from which element the signal should be output to the oscilloscope can be determined appropriately, according to the transmission rate of the apparatus concerned, that is, the number of signal points.

We claim:

1. A method of outputting an eye pattern that indicates positions of reception signals on a two-dimensional plane, comprising the steps of:
    a) making a decision about which quadrant of the two-dimensional plane contains the reception signal;
    b) applying a moving operation, based on the decision made in step a), to the reception signal to move the reception signal on the two-dimensional plane, said moving operation being carried out such that ideal signals contained in the respective regions are superimposed on each other when the moving operation is applied thereto, wherein step b) comprises the substep of:
        i) applying a rotation operation, based on the decision made in step a), to the reception signal to move the reception signal into a specific quadrant such that ideal signals contained in the respective quadrants are superimposed on each other
    c) making a decision about which of plural square regions of the specific quadrant contains the reception signal moved in step b); and
    d) applying a translation operation, based on the decision made in step c), to the reception signal moved in step b) to move the reception signal into a specific square region such that ideal signals contained in the respective square regions are superimposed on each other.

2. A method according to claim 1, further comprising the step of:
    d) enlarging the signal, moved into a specific square region in step d), by a prescribed magnification factor.

3. A method of outputting an eye pattern that indicates positions of reception signals on a two-dimensional plane, comprising the steps of:
    a) making a decision about which of plural regions contains a reception signal, said regions being defined by dividing the two-dimensional plane into the plural regions such each that each region comprises at least one ideal signal, wherein step a) comprises the substep of:
        i) making a decision about which of plural square regions of the two-dimensional plane contains the reception signal;
    b) applying a moving operation, based on the decision made in step a), to the reception signal to move the reception signal on the two-dimensional plane, said moving operation being carried out such that ideal signals contained in the respective regions are superimposed on each other when the moving operation is applied thereto, wherein step b) comprises the substep of:
        i) applying a translation operation, based on the decision made in substep i) of step a), to the reception signal to move the reception signal into a specific square region; and
    c) outputting the moved reception signal.

4. A method according to claim 3, further comprising the step of:
    d) enlarging the moved signal by a prescribed magnification factor before outputting in step c).

5. An apparatus for outputting an eye pattern that indicates positions of reception signals on a two-dimensional plane, comprising:
    a) means for making a decision about which of plural regions contains a reception signal, said regions being defined by dividing the two-dimensional plane into a plurality of regions each comprising at least one ideal signal, wherein the decision making means comprises:
first means for making a decision about which quadrant of the two-dimensional plane contains the reception signal, b) means for applying a moving operation based on the decision made by the decision making means to the reception signal to move the reception signal on the two-dimensional plane, said moving operation being carried out such that ideal signals contained in the respective regions are superimposed on each other when the moving operation is applied thereto, wherein the moving operations applying means comprises:
means for applying a rotation operation, based on the decision made by the first decision making means, to the reception signal to move the reception signal into a specific quadrant;

the decision making means further comprising:
second means for making a decision about which of plural square regions of the specific quadrant contains the reception signal moved by the rotation operation applying means; and the moving operation applying means further comprising:
means for applying a translation operation based on the decision made by the second decision making means to the reception signal moved by the rotation operation supplying means to move the reception signal into a specific square region; and c) means for outputting the moved reception signal.

6. An apparatus according to claim 5, further comprising:
means for enlarging the moved signal by a prescribed magnification factor before being output by the outputting means.

7. An apparatus for outputting an eye pattern that indicates positions of reception signals on a two-dimensional plane, comprising:

a) means for making a decision about which of plural regions contains a reception signal, said regions being defined by dividing the two-dimensional plane into a plurality of regions each comprising at least one ideal signal, wherein the decision making means comprises:
first means for making a decision about which of square regions of the two-dimensional plane contains the reception signal;

b) means for applying a moving operation based on the decision made by the decision making means to the reception signal to move the reception signal on the two-dimensional plane, said moving operation being carried out such that ideal signals contained in the respective regions are superimposed on each other when the moving operation is applied thereto, wherein the moving operation applying means comprises:
means for applying a translation operation based on the decision made by the first decision making means to the reception signal to move the reception signal into a specific square region; and c) means for outputting the moved reception signal.

8. An apparatus according to claim 7, further comprising:
means for enlarging the moved signal by a prescribed magnification factor before being output by the outputting means.

9. A communication apparatus for demodulating a modulated signal and obtaining a reception signal having a two-dimensional value, comprising:

a) means for making a decision about which of plural regions contains a reception signal, said regions being defined by dividing the two-dimensional plane into a plurality of regions each comprising at least one ideal signal, wherein the decision making means comprises:
first means for making a decision about which quadrant of the two-dimensional plane contains the reception signal;

b) means for applying a moving operation based on the decision made by the decision making means to the reception signal to move the reception signal on the two-dimensional plane, said moving operation being carried out such that ideal signals contained in the respective regions are superimposed on each other when the moving operation is applied thereto, wherein the moving operation applying means comprises:
means for applying a rotation operation based on the decision made by the first decision making means to the reception signal to move the reception signal into a specific quadrant;

the decision making means further comprising:
second means for making a decision about which of plural square regions of the specific quadrant contains the reception signal moved by the rotation operation applying means; and the moving operation applying means further comprising:
means for applying a translation operation based on the decision made by the second decision making means to the reception signal moved by the rotation operation applying means to move the reception signal into a specific square region; and c) means for outputting the moved reception signal.

10. A communication apparatus according to claim 9, further comprising:
means for enlarging the moved signal by a prescribed magnification factor before being output by the outputting means.

11. A communication apparatus for demodulating a modulated signal and obtaining a reception signal having a two-dimensional value, comprising:

a) means for making a decision about which of plural regions contains a reception signal, said regions being defined by dividing the two-dimensional plane into a plurality of regions each including at least one ideal signal, wherein the decision making means comprises:
first means for making a decision about which of square regions of the two dimensional plane contains the reception signal;

b) means for applying a moving operation based on the decision made by the decision making means to the reception signal to move the reception signal on the two-dimensional plane, said moving operation being carried out such that ideal signals contained in the respective regions are superimposed on each other when the moving operation is applied thereto, wherein the moving operation applying means comprises:
means for applying a translation operation based on the decision made by the first decision making means to the reception signal to move the reception signal into a specific square region; and means for outputting the moved reception signal.

12. A communication apparatus according to claim 11, further comprising:
means for enlarging the moved signal by a prescribed magnification factor before being output by the outputting means.

13. A method for displaying an eve pattern indicating positions of received signal points on a complex plane having quadrants defined therein, wherein the complex plane is divided into a plurality of small planes having common, respective measurements, comprising the steps of:

determining in which quadrant of the complex plane a received signal point exists;

transferring the received signal point to a specific quadrant of the complex plane by rotating the received signal on the complex plane, around the origin of the complex plane, by a rotating angle corresponding to a quadrant in which the received signal exists;

determining in which small plane of the specific quadrant the signal point, transferred into the specific quadrant, exists;

transferring the signal point into a specific small plane by shifting the transferred signal point, a shifting value of the signal point being determined by the small plane in which the transferred signal point exists;

outputting the signal point transferred into the specific small plane of the specific quadrant as an output signal point; and displaying the output signal point on a display.

14. A method of displaying an eye pattern indicating positions of received signal points on a complex plane, comprising the steps of:

dividing the complex plane into a plurality of small planes, each of the small planes containing a common number of ideal signal points therein and having common, respective dimensional measurements;

determining in which small plane a received signal point exists;

transferring the determined signal point to a specific small plane by shifting the signal point; and outputting the transferred signal point for displaying same on a display.

15. A method of displaying an eye pattern indicating positions of received signal points on a complex plane, comprising the steps of:

dividing the complex plane into a plurality of small planes, each of the small planes containing a common number of ideal signal points therein, the ideal signal points being arranged to be symmetrical around a specific point in each small plane;

determining in which small plane a received signal point exists;

producing a shifting value corresponding to a small plane in which the received signal point exists;

shifting the received signal point into a specific small plane by the shifting value; and outputting the shifted signal point for displaying same on a display.

16. A communication apparatus for receiving a signal point on a complex plane and demodulating the received signal point, comprising:

a quadrant rotator rotating the received signal point into a specific quadrant of the complex plane by a rotating angle corresponding to a quadrant in which the received signal point exists;

an origin shifter shifting the rotated signal point into a specific small plane of the specific quadrant, the specific quadrant being divided into a plurality of small planes each containing a common number of respective ideal signal points;

a digital-to-analog converter converting an output digital signal from the origin shifter into an analog signal and outputting same as an output signal; and an oscilloscope receiving the output signal from the digital-to-analog converter for display thereof as the received signal point.

17. The communication apparatus as set forth in claim 16, further comprising:

an enlarger receiving the output digital signal from the original shifter and enlarging an area of the specific small plane, in which the received signal point is shifted by the origin shifter, and producing a corresponding output signal of the enlarger, supplied as the output digital signal to the digital-to-analog converter, for conversion thereby into the analog signal output thereby.

18. The communication apparatus as set forth in claim 16, wherein:

the origin shifter further comprises means for producing a shift-value of the signal point corresponding to the small plane in which the rotated signal point exists; and the rotated signal point is shifted by the origin shifter into the specific small plane by the shift-value.

19. A method of reducing a number of positions of reception signals on a two-dimensional plane, comprising the steps of:

a) dividing the two-dimensional plane into a plurality of regions, each region including at least one ideal signal and the plurality of regions having a common pattern of respective ideal signals contained therein;

b) defining a relationship to a selected region of each of the plurality of regions; and c) for each reception signal in a corresponding region, other than the selected region, moving the reception signal into the selected region to a position therein such that corresponding, ideal signals of the selected region and the corresponding region of the moved reception signal are superimposed and the moved reception signal is in the same relative position in the selected region as in the corresponding region thereof.

20. A method for displaying an eye pattern indicating positions of received signal points on a complex plane, relative to quadrants of the complex plane disposed in succession about an origin thereof, comprising the steps of:

determining, for each received signal point, the corresponding quadrant of the complex plane in which the received signal point exists;

defining a selected quadrant of the complex plane;

rotating the received signal point, if positioned in other than the selected quadrant, to the selected quadrant at a position therein such that respective, ideal signals of the selected quadrant and the corresponding quadrant of the moved reception signal are superimposed and the moved reception signal is in the same relative position in the selected quadrant as in the corresponding quadrant thereof; and producing an output signal representative of at least a selected portion of the selected quadrant of the complex plane containing the rotated, received signal, for display.

21. The method as recited in claim 20, further comprising:

dividing the selected quadrant into plural regions, each of common dimensions and containing at least one ideal signal point;

commonly defining respective, replacement origins of the plural regions; and selecting the replacement origin and the respective region of the selected quadrant for producing the output signal corresponding to the selected portion of the eye pattern for display.

* * * * *

UNITED STATES PATENT AND TRADEMARK OFFICE
CERTIFICATE OF CORRECTION

PATENT NO.: 5,987,064
DATED : November 16, 1999
INVENTOR(S): Takashi KAKU et al.

It is certified that error appears in the above-identified patent and that said Letters Patent is hereby corrected as shown below:

Col. 12, line 66, change "eve" to --eye--.

Signed and Sealed this

Third Day of April, 2001

*Attest:*

NICHOLAS P. GODICI

*Attesting Officer*     *Acting Director of the United States Patent and Trademark Office*